United States Patent [19]
Delavaux et al.

[11] Patent Number: 5,646,762
[45] Date of Patent: Jul. 8, 1997

[54] OPTICAL COMMUNICATION SYSTEM USING TANDEM FABRY-PEROT ETALON FOR WAVELENGTH SELECTION

[75] Inventors: Jean-Marc Pierre Delavaux, Wescosville; Paul David Yeates, Longswamp Township, Berks County, both of Pa.

[73] Assignee: Lucent Technologies Inc., Murray Hill, N.J.

[21] Appl. No.: 553,128

[22] Filed: Nov. 7, 1995

[51] Int. Cl.$^6$ .................................................. H04B 10/12
[52] U.S. Cl. .......................... 359/173; 359/134; 359/160
[58] Field of Search .................................. 359/124, 127, 359/134, 173, 183, 160–161, 194; 372/6; 356/345, 346

[56] References Cited

U.S. PATENT DOCUMENTS

| | | | |
|---|---|---|---|
| 4,813,756 | 3/1989 | Frenkel et al. | 359/127 |
| 4,861,136 | 8/1989 | Stone et al. | 359/127 |
| 5,287,366 | 2/1994 | Epworth et al. | 372/26 |

*Primary Examiner*—Kinfe-Michael Negash
*Attorney, Agent, or Firm*—Richard D. Laumann; Lester H. Birnbaum

[57] ABSTRACT

A tunable tandem Fabry-Perot etalon in used in wavelength division multiplexed optical systems or in an optical device. One path is used to calibrate the pre-spectral range with respect to a reference wavelength and the other path is used to select and acquire the desired wavelength.

15 Claims, 1 Drawing Sheet

OPTICAL COMMUNICATION SYSTEM USING TANDEM FABRY-PEROT ETALON FOR WAVELENGTH SELECTION

TECHNICAL FIELD

This invention relates generally to the field of optical systems using Fabry-Perot etalons and particularly to such systems using tunable Fabry-Perot etalons for wavelength selection.

BACKGROUND OF THE INVENTION

Optical communications systems using a light source and photodetector or signal regenerator optically coupled to each other by means of an optical fiber have reached a stage of significant commercial importance and technical sophistication. Data rates in excess of 10 Gbit/sec and transmission distances in excess of 1000 kilometers are routinely achieved in commercial practice. To reach these levels of importance and sophistication, many types of components have been developed.

To cover a long transmission distance, initial optical communications systems detected optical signals and used these signals to create electrical signals and generates new optical signals using the electrical signals in a repeater. Newer optical communications systems use optical amplifiers to regenerate the signal. In such systems, the optical signals are optically amplified rather than being converted first into an electrical signal. The optical amplifiers are typically rare earth, such as erbium, doped optical fibers. See, for example, IEEE Photonics Technology Letters, pp. 727–729, August 1991, for a description of an erbium doped fiber preamplifier. The preamplifier described in this paper also has a tunable optical filter which the authors stated could have any of several forms including a fiber Fabry-Perot. An exemplary tunable Fabry-Perot filter using optical fibers was described by Miller at the European Conference on Optical Communication, Sept. 16–20, 1990. Use of fibers permitted the size of the filter to be reduced as compared to the size of filters using bulk components. Wavelength tuning was obtained by temperature variations. Numerous uses for the filter were mentioned.

To increase the capacity of communications systems, wavelength division multiplexing systems have been developed. Such systems transmit signals on a plurality of wavelengths. At the receiver, it is frequently desirable or necessary to select a particular wavelength signal from a group of several wavelengths. Wavelength selection may be done by adding a signature to each signal transmitted on the optical fiber. The signature may consist of, for example, a specific tone signal associated with each wavelength. The tone may take the form of a small (amplitude, frequency, and so forth) sine wave superimposed on the already modulated carrier. At the receiver, the characteristic signatures allow identification and locking of the desired wavelength.

Wavelength calibration is typically performed by comparing a reference signal (passive or active) to the transmitted or received signals. The active reference may consist of a very stable source such as a helium-neon or krypton laser while a passive reference may utilize the absorption resonances of a substance such as acetylene gas. Other conventional techniques based on coherent beat or diffraction gratings are known.

The above techniques require constant access to the wavelength reference signal and this requirement reduces system efficiency.

SUMMARY OF THE INVENTION

According to an exemplary embodiment of this invention, an optical device has a preamplifier having an input and an output; an amplifier, said amplifier having an input and an output; a voltage source; a digital processor connected to the voltage source, a source of a reference wavelength, a photodetector, and a tunable Fabry-Perot etalon having two optical paths through the etalon. The etalon has first and second inputs and first and second outputs with the first and second inputs being connected to the preamplifier and reference wavelength, respectively. The first and second outputs are connected to the amplifier and photodetector, respectively. The voltage source is connected to the etalon and tunes the optical paths through the etalon in response to signals received from the photodetector and processed by the digital processor.

In yet another embodiment of the invention, the optical device has a tunable Fabry-Perot etalon with first and second inputs and first and second outputs, a source of a reference wavelength, a photodetector, a voltage source, and a digital processor. The source and photodetector are connected to the second input and second output, respectively. The digital processor is connected to the photodetector and voltage source. The voltage source is connected to the Fabry-Perot etalon. The source of a reference wavelength may be remotely located.

In another aspect of the invention, an optical communications system has a transmitter and a receiver and optical fibers connecting the transmitter and receiver to the optical device.

DETAILED DESCRIPTION

Figure 1:
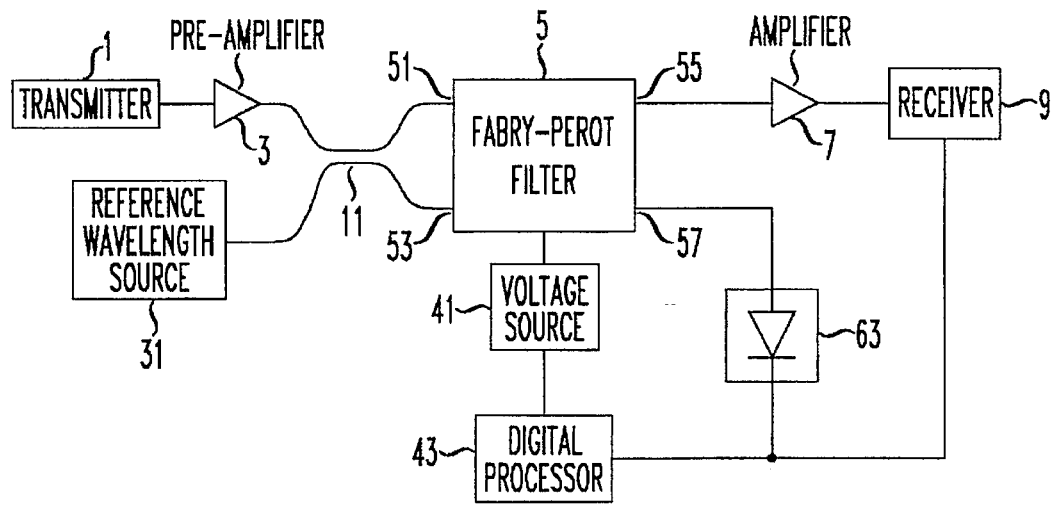
FIGS. 1 and 3 are schematic representation of optical systems according to this invention which use a tandem Fabry-Perot etalon for the acquisition of a desired signal from a plurality of signals.

The invention will first be described by reference to the exemplary embodiment of the invention depicted in FIG. 1. It will be readily appreciated that, for reason of clarity, the elements depicted are not drawn to scale. Shown are transmitter 1, preamplifier 3, tunable tandem Fabry-Perot(FP) filter 5, amplifier 7, and receiver 9. A multiplexer 11 is connected to the preamplifier 3. There is a source of a reference wavelength 31 and a photodetector 63. Optical fibers connect the transmitter to the preamplifier and the amplifier to the receiver. Optical coupling means, such as optical fibers or other waveguides, couple the source 31 and photodetector 63 to the filter 5. Filter 5 has first and second inputs 51 and 53 and first and second outputs 55 and 57. There are two optical paths through the filter; the paths are between input 51 and output 55 and between input 53 and output 57, respectively. The first and second inputs are connected to the two output ports of the multiplexer 11. An input port of multiplexer 11 is connected to preamplifier 3. The first and second output ports are connected to the amplifier 7 and to the photodetector 63, respectively. Voltage source 41 is connected to photodetector 63 through digital processor 43. Varying the voltage from source 41 tunes both paths through the filter simultaneously. There is also a connection between the receiver 9 and digital processor 43. Elements are described as being coupled to each other; this terminology is used to mean optical coupling and does not preclude the presence of intermediate elements. Filter 5 may also be referred as an etalon.

Several types of sources may be used for the reference wavelength. For example, a semiconductor laser may be used. Alternatively, a fiber ring laser or a fiber grating laser may be used. Still other types can be used.

All of these elements are well known to those skilled in art and will be readily connected together by those skilled in the art. For example, the components of both transmitter 1 and receiver 9 are well known as are the optical fibers or other optical waveguides and to optically couple the elements described. Fabrication of the Fabry-Perot etalon is well known and its operation is described in literature for commercially available tunable etalons. See TB2500 Tunable Fabry-Perot Filter, JDS-Fitel. Tuning is expediently performed by changing the applied voltage to the filter 5; other techniques could be used.

Operation of the embodiment described, as well as the operation of the optical device is now readily understood. The reference wavelength is used to calibrate the system. The different free spectral ranges are measured versus voltage. In addition to the various types of sources previously mentioned, it is noted that the reference wavelength may come from either a local or a remote source located at, for example, a receiver or transmitter. The reference wavelength is extracted with the demultiplexer 11 located before the Fabry-Perot etalon. If the reference wavelength is located locally, the multiplexer 11 may be omitted.

Figure 2:
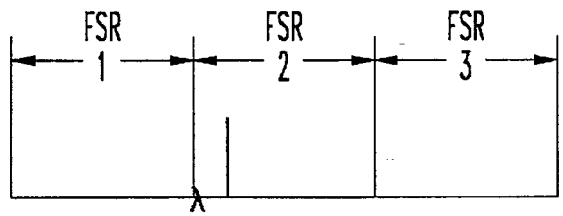
FIG. 2 is a representation of the free spectral ranges and is useful is describing the signal locking process.

FIG. 2 is useful in explaining how the desired signal is extracted and how the system locks onto the desired signal. Depicted are three free spectral ranges horizontally in arbitrary wavelength units and the amplitude of the reference wavelength vertically in arbitrary units.

The system or device is calibrated as follows. The system must be calibrated before signal acquisition. Calibration is the process of identifying the reference wavelength signal in terms of the FP tuning voltage (FPTV) and locating the FPTV for the centermost FSR. It is desirable to identify two adjacent references modes as close to the center of the FP voltage sweep range as possible. This is FSR2 in FIG. 2.

The calibration process may be either active or passive. With active calibration, the system calibrates when power is turned on. The FP tuning voltage 41 sweeps through the complete tuning range and stores in memory the voltages at which the reference wavelength is detected by photodetector 63. These voltages are processed by digital processor 43 to determine the position of FSR2 in terms of the FP tuning voltage. When the position of FSR2 in terms of FP tuning voltage is known, the FP tuning voltage for a specific wavelength can be determined. This technique suffers a drawback when a new channel is to be detected and the temperature has changed since the last scan. The new channel may not be at the calculated position and the system may lock onto the wrong channel. A new scan should be performed every time the channel is changed. However, manufacturing costs are saved as no pretuning is required at the time of manufacture.

With passive calibration, the FP filter is calibrated during manufacture. The objective of this calibration process is identical to that in the active case; that is, locate the centermost FSR. However, data is also collected as the temperature is varied. The data are analyzed and a temperature versus FSR position is obtained. The resulting data are stored in memory either as a look up table or as coefficients used in calculating the channel location as a function of temperature. The temperature has to be measured by, for example, an element of the device (not shown) to determine the temperature dependence of the FP tuning voltage for a desired wavelength channel. From the temperature and the wavelength of the desired channel, the FP tuning voltage can be calculated or obtained from a look up table. There is increased cost during manufacture, but the system is easily made and channels can be changed without removing the system from service.

The position of the FPTV for a locked signal or wavelength is an important consideration and should be taken into account so that the desired wavelength can be accurately tracked as systems parameters, such as temperature, vary. Positioning the FPTV as close as possible to the centermost free spectral range gives the widest locking range; that is, the FPTV dynamic tuning range is optimized. Additionally, if lock is lost, the system can determine whether the signal has drifted in its wavelength or has ceased to transmit. See, FIG. 2.

Figure 3:
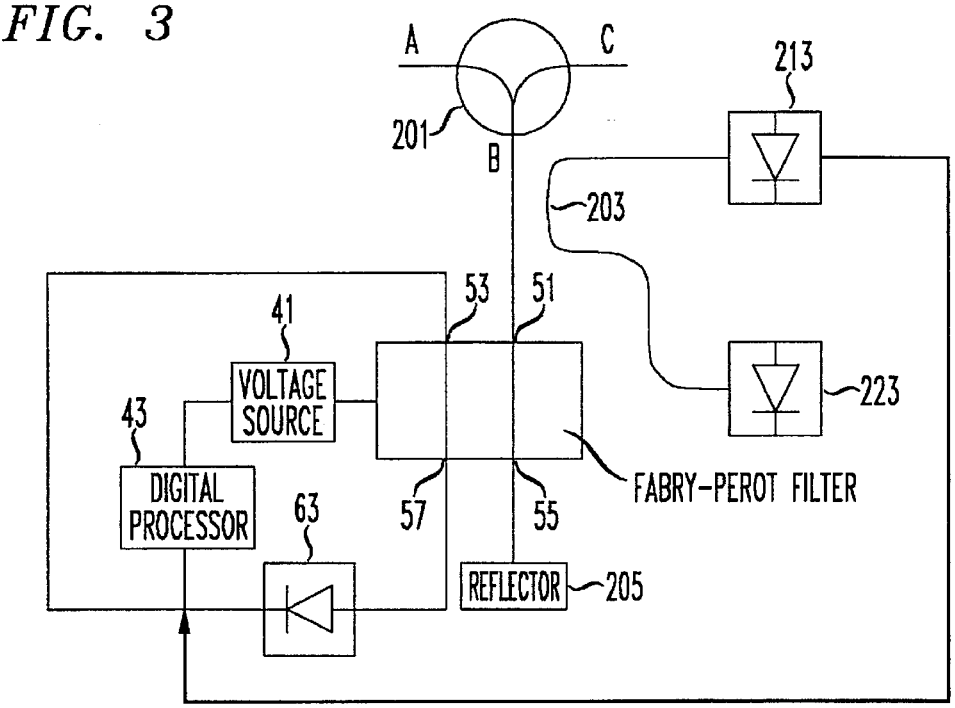

The embodiment described with respect to FIG. 1 used the filter in transmission. The filter may also be used in reflection and an embodiment using the filter in reflection is depicted in FIG. 3. In this embodiment, there is an optical circulator 201, optical coupler 203, and reflector 205 in addition to the elements depicted in FIG. 1. The circulator 203 has three ports with ports A and C connected to the incoming and outgoing signals, respectively, and port B connected to the Fabry-Perot filter. The reflector 205 is connected to output 55 of the filter. Coupler 203 is connected between port B of the circulator one of the inputs of the filter. Coupler 203 is used to extract a portion of the signal so that the signal to noise ratio may be monitored by photodetector 213 and unit 223 which measures the signal to noise ratio, and to also maintain a lock on the desired wavelength using well known techniques. This embodiment is advantageously used because the Fabry-Perot is used to filter the amplified spontaneous emission and filter efficiency is increased because of two passes through the filter.

Variations of the embodiments described will be readily thought of by those skilled in the art. For example, the preamplifier and amplifier depicted in FIG. 1 may be omitted in some embodiments. The multiplexer may be omitted if a local reference source is used.

The invention claimed is:

1. An optical device comprising:
   a tunable Fabry-Perot etalon having first and second optical inputs and first and second optical outputs;
   a photodetector, said photodetector being connected to said second output;
   a voltage source, said voltage source being connected to said tunable Fabry-Perot etalon; and
   a digital processor, said digital processor being connected to said photodetector and to said voltage source.

2. An optical device as recited in claim 1 further comprising a preamplifier connected to said first input.

3. An optical device as recited in claim 2 further comprising an amplifier connected to said second output.

4. An optical device as recited in claim 1 further comprising a reflector connected to said second output.

5. An optical device as recited in claim 4 further comprising an optical circulator having first, second, and third ports, said second port being connected to said first input.

6. An optical device as recited in claim 1 further comprising a source of a reference wavelength, said source being connected to said second input.

7. An optical device as recited in claim 1 in which said digital processor further comprises memory for storing tuning voltages for wavelengths.

8. An optical device as recited in claim 7 in which said digital processor further comprises memory for storing tuning voltages for temperatures.

9. An optical communications system comprising:

a transmitter;

a receiver:

a preamplifier, said preamplifier having an input and an output;

an amplifier, said amplifier having an input and an output;

first and second optical fibers optically connecting said transmitter and said preamplifier and said amplifier and said receiver, respectively;

a tunable Fabry-Perot etalon having first and second inputs and first and second outputs, said first and second fibers being optically coupled to said first input and to said first output; a source of a reference wavelength, said source being connected to said second input;

a photodetector, said photodetector being connected to said second output;

a voltage source, said voltage source being connected to said tunable Fabry-Perot etalon; and a digital processor, said digital processor being connected to said photodetector and to said voltage source.

10. An optical communications system as recited in claim 9 further comprising a preamplifier connected to said first input and to said first fiber.

11. An optical communications system as recited in claim 10 further comprising an amplifier connected to said first output and to said second fiber.

12. An optical communications system as recited in claim 9 further comprising a reflector connected to said first output.

13. An optical communications system as recited in claim 12 further comprising an optical circulator having first, second, and third ports, said second port being connected to said first input.

14. An optical communications system as recited in claim 9 in which said digital processor further comprises for storing tuning voltages for wavelengths.

15. An optical communications system as recited in claim 14 in which said digital processor further comprises memory for storing tuning voltages for temperatures.

* * * * *